SUBSTITUTE FOR MISSING XR
Oct. 14, 1947.  A. H. LAMB  2,428,975
ILLUMINATED MIRROR
Filed Aug. 19, 1944
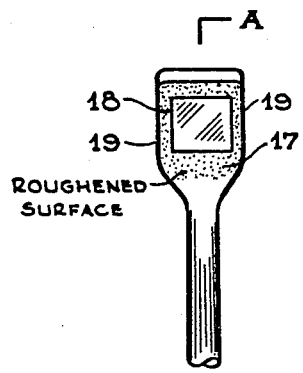
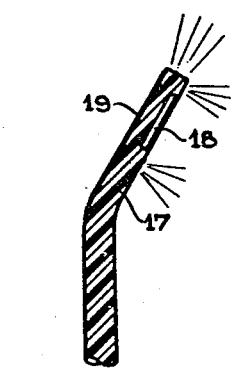
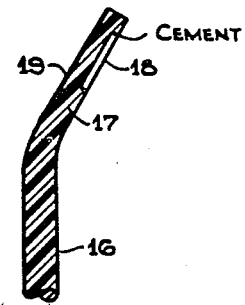
FIG.-3.
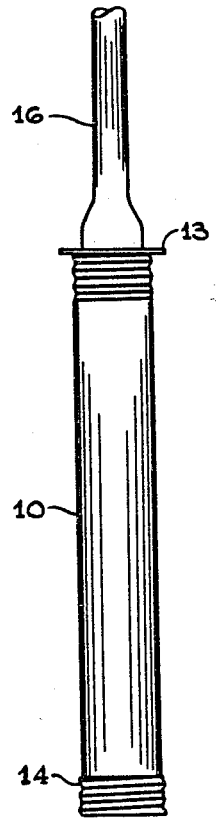
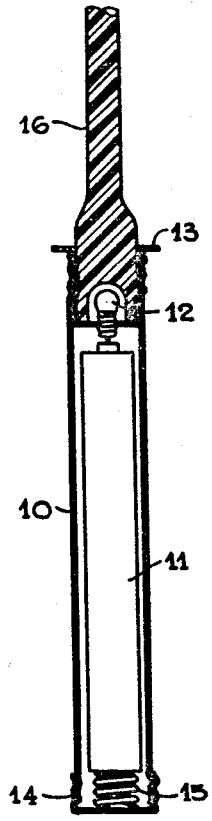
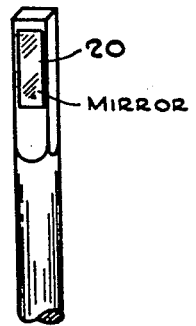
FIG.-4.
FIG.-1  FIG.-2
Anthony H. Lamb  Inventor
By R. J. Jurick  Attorney Patented Oct. 14, 1947

2,428,975

UNITED STATES PATENT OFFICE 2,428,975

ILLUMINATED MIRROR

Anthony H. Lamb, Hillside, N. J.

Application August 19, 1944, Serial No. 550,168

2 Claims. (Cl. 240—6.4)

This invention relates to small mirrors of the type generally known as "dental mirrors" and more particularly to an illuminated mirror adapted for use in the examination or inspection of remote surfaces not directly visible to the observer.

The construction of the common dental mirror is well known. Such mirrors are used extensively in the dental profession but their use requires a high level of external illumination. This requirement together with the high cost of such devices has militated against their general use in the home. Yet the requirement for a simple, practical device of this type is apparent such as, for example, for the periodic examination of a child's teeth.

There also exists an industrial requirement for a similar device as a convenient tool for the inspection of internal surfaces of products or parts having peculiar shapes.

It has been proposed to fulfill the above requirements by providing a conventional dental mirror having a small battery and light bulb attached to the handle in such manner that light rays emanating from the bulb impinge upon the surface of the mirror from whence they are reflected to the surface under examination. However, such a device has only a limited field of usefulness as any obstruction interposed between the light bulb and the mirrow completely blocks off the required light.

An illuminated mirror made in accordance with this invention overcomes the stated objections inherent in the prior devices as the required illumination is furnished around the periphery of the mirror and cannot be cut off by external objects.

An object of this invention is the provision of a self-contained illuminated mirror suitable for use in the inspection of remote surfaces which are not directly visible to the observer.

An object of this invention is the provision of light transmitting rod and means for introducing light rays into the end of the rod whereby the light rays are transmitted through the rod and emerge around the periphery of the mirror.

An object of this invention is the provision of an improved dental mirror comprising a body member carrying a dry cell battery and light bulb, a rod of light conducting material attached to the body member adjacent the light bulb and a mirror affixed to the free end of the rod whereby light rays emanating from the bulb are transmitted through the rod and emerge around the periphery of the mirror.

These and other objects and advantages will be apparent from the following description when taken with the accompanying drawings which illustrate several embodiments of the invention. The drawings are for purposes of illustration and are not intended to define the scope of the invention; reference being had for this purpose to the appended claims.

In the drawings wherein like characters identify like parts in the several figures:

Figure 1 is a front view of an illuminated mirror made in accordance with this invention, Figure 2 is a cross-sectional view of the figure 1 construction taken along the line A—A, Figure 3 is a fragmentary, cross-sectional view of the light transmitting rod and showing another embodiment of the invention, and Figure 4 is also a fragmentary view of the light transmitting rod and showing still another embodiment of the invention.

Referring now to the drawings, the numeral 10 identifies a cylindrical tube which houses a small dry cell battery 11 and a flash-light bulb 12. The tube is properly proportioned to provide a convenient handle for the complete device and is preferably made of metal. The light bulb 12 is retained in position by being screwed into the metal collet 13 which in turn is secured to the tube 10 by means of coacting, coarse threads, substantially as shown. Inasmuch as the tube 10 is metal the electrical circuit to the bulb can be controlled by means of the end cap 14. By screwing the end cap 14 into final position against the action of a spring 15 the battery 11 is advanced to establish contact with the bottom of the bulb 12. The electrical return path comprises the collet 13, tube 10, cap 14, and spring 15. By unscrewing the end cap slightly the battery is released thereby breaking contact with the bulb.

The manner of controlling the electrical circuit forms no part of the present invention and may be accomplished in any desired manner. Thus, if the tube 10 be made of plastic the battery circuit may take the form employed in a conventional flash-light including a thumb operable switch.

The light transmitting member comprises a transparent, plastic rod 16 which is threaded into the collet 13 and thereby positioned in proper light transmitting relationship with respect to the bulb 12. Preferably, the rod 16 includes an offset end section that is flattened to form a head 17 thereby providing an enlarged surface for the accommodation of a mirror 18. As illustrated in Figures 1 and 2, the mirror 18 is molded directly into the plastic thereby resulting in a smooth, unbroken surface on the head 17. The absence of crevices eliminates the possibility of dust or dirt accumulation resulting in a sanitary device. Furthermore, as the surface of the mirror is not exposed the device may be inserted into the mouth without producing "cold shock" experienced when metal or glass is brought into initial contact with a tooth.

The surface area of the mirror 18 is less than the corresponding surface area of the head 17. Thus, light rays emanating from the light bulb are transmitted through the rod 16 and emerge around the periphery of the mirror. In order to increase the quantity of emerging light the peripheral surface of the head 17 may be roughened as by sandblasting. Further toward this end all surfaces of the head 17 may be sandblasted after which all surfaces, except those adjacent to the mirror, may be coated with a suitable light reflecting medium 19 such as silver or aluminum paint. The coating 19 prevents the escape of light rays in any but the desired direction and consequently a fairly brilliant light is provided. However, when the device is intended for home use I prefer to also leave the end of the head 17 uncoated as shown in Figures 1 and 2. Light emerging from the exposed end section increases the utility of the device by permitting its use as a throat light.

As stated hereinabove, the mirror 18 is preferably molded into the plastic head 17. However, the head 17 may be formed to include a suitable depression in the front surface thereof, such depression conforming in size and shape to that of the mirror to be used. In such case the mirror may be inserted into the depression with a snap action or, alternatively, cemented therein as shown in Figure 3.

A somewhat simplified construction of the light transmitting rod is illustrated in Figure 4 wherein the rod terminates in a rectangular end section having a rectangular mirror affixed to the surface.

While I have described a complete, self-contained illuminated mirror including a battery and light bulb carried by a handle section, the invention is not limited to this specific combination. The transparent rod and mirror may be produced as a separate product and the rod may be provided with any suitable coupling arrangement permitting its attachment to existing pencil flashlights or other portable light sources.

The particular form, shape and dimensions of the various components forming my illuminated mirror are a matter of choice but certain modifications may be dictated by the use for which a particular device may be designed. Such variations and modifications will be apparent to those skilled in the art and may be made without departing from the spirit and scope of the invention as set forth in the claims.

I claim:

1. In an illuminated mirror for oral use the combination of, a tubular casing adapted to fit within the hand and carrying therein a battery and an electric bulb; means for completing the circuit between the battery and bulb to energize said bulb; an elongated rod of light transmitting plastic extending axially from said casing; a mirror sealed within a depression in the said rod at the free end thereof, the surface area of the mirror being less than the area of the complementary surface of said rod and lying substantially in the same plane, whereby light rays emanating from the bulb traverse the rod and emerge therefrom around the periphery of the mirror.

2. The invention as recited in claim 1 wherein the end of the plastic rod is flattened and offset from the main axis of the rod.

ANTHONY H. LAMB.

REFERENCES CITED

The following references are of record in the file of this patent:

UNITED STATES PATENTS

| Number | Name | Date |
|---|---|---|
| 2,347,665 | Christensen et al. | May 2, 1944 |
| 1,642,187 | Young | Sept. 13, 1927 |
| 2,186,143 | Neugass | Jan. 9, 1940 |
| 657,199 | Lawton | Sept. 4, 1900 |
| 2,195,526 | Traver | Apr. 2, 1940 |
| 1,799,545 | Chase | Apr. 7, 1931 |
| 2,358,867 | Madan | Sept. 26, 1944 |
| 2,316,301 | Ullman | Apr. 13, 1943 |